UNITED STATES PATENT OFFICE.

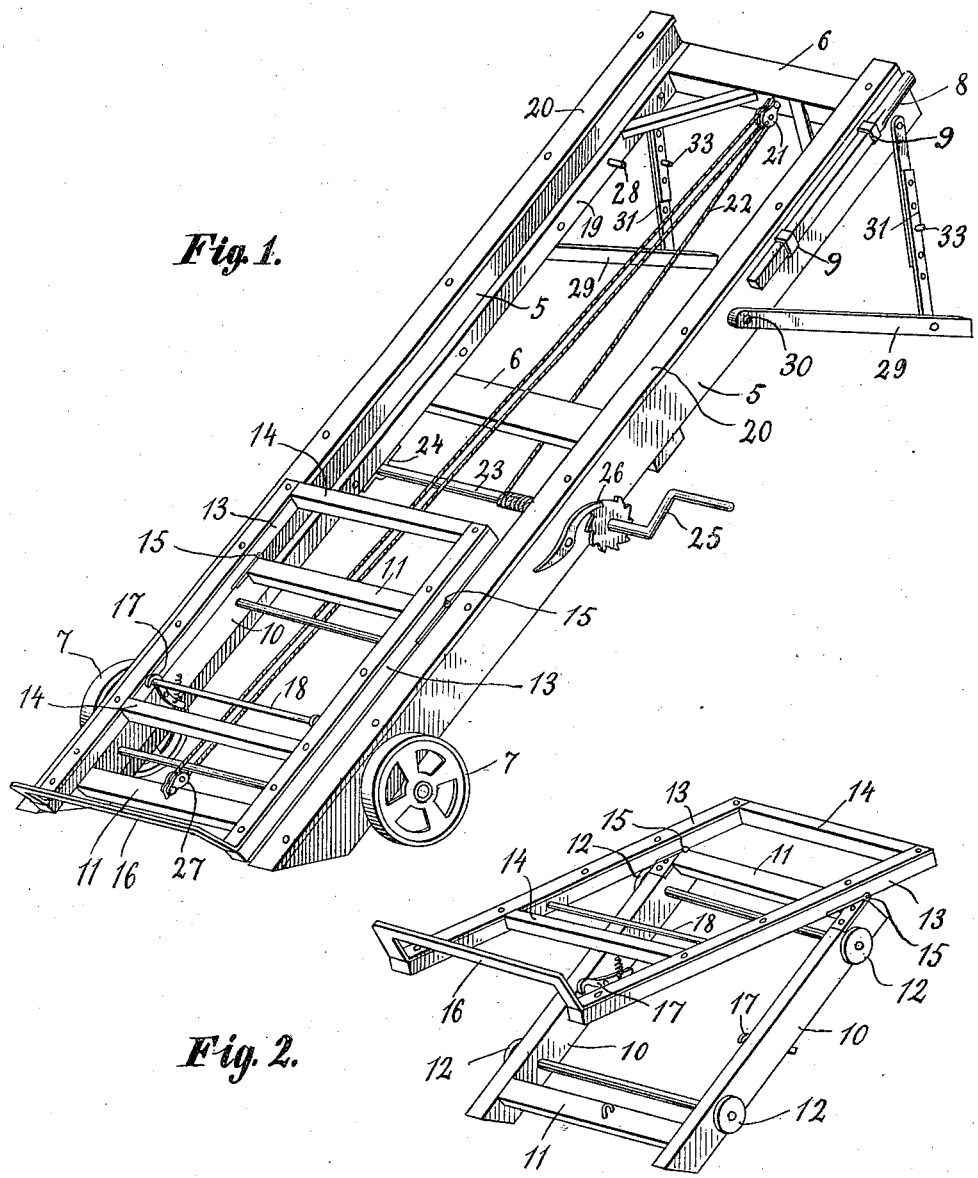

DAVID M. WADLINGTON, OF GOREE, TEXAS.

ELEVATING-TRUCK.

1,015,104.      Specification of Letters Patent.      Patented Jan. 16, 1912.

Application filed June 9, 1911. Serial No. 632,225.

*To all whom it may concern:*

Be it known that I, DAVID M. WADLINGTON, a citizen of the United States, residing at Goree, in the county of Knox and State of Texas, have invented certain new and useful Improvements in Elevating-Trucks, of which the following is a specification.

This invention relates to that class of trucks which are provided with a carriage mounted for travel thereon and operated by a hoisting device. The load is supported on the carriage and by placing the truck in inclined position, the load may be elevated upon operating the hoisting device to bring the carriage to the upper end of the truck.

It is the object of the present invention to provide in a truck of the kind stated a novel and improved carriage structure, the same being characterized by a tilting load carrier which is automatically released when the carriage reaches the end of its travel.

The invention is also applicable to other types of elevating apparatus.

Other objects and advantages of the invention will be apparent from the detailed description appearing hereinafter.

In order that the invention may be better understood, reference is had to the accompanying drawing forming a part of this specification, in which drawing—

Figure 1 is a perspective view of a truck constructed in accordance with the present invention. Fig. 2 is a perspective view of the carriage removed from the truck, the tilting frame to be hereinafter described being shown in dumping position.

Referring specifically to the drawing, the frame of the truck comprises parallel and spaced side beams 5 connected at suitable intervals by cross bars 6, and mounted at their lower ends on wheels 7. To the upper end of the side beams are connected handles 8 which slide under loops 9 so that they may be placed out of the way when the truck is positioned for elevating the load.

The carriage or load carrier comprises a frame consisting of spaced longitudinal side bars 10 which are connected by cross bars 11, and mounted on wheels 12. On the carriage is mounted a tilting frame comprising side bars 13 connected by cross bars 14. The side bars 13 are hinged to the side bars 10 at one of the ends thereof as indicated at 15, and project therefrom a short distance so that they may be tilted. The side bars 13 are also connected at one of their ends by a tail piece 16 which is turned up to hold the load in place. The tilting frame is adapted to support the load, and it normally rests on the carriage, the side bars 13 seating on the side bars 10. The tilting frame is held in carrying position by means of pivoted spring latches 17 carried by the bars 10 and having hooked ends which engage over a cross rod 18 carried by the side bars 13. Upon disengaging the latches, the tilting frame may be swung into dumping position as shown in Fig. 2.

On the opposite faces of the side beams 5, at the bottom thereof, are secured strips 19 which form a track on which the wheels 12 of the carriage travel, said track extending throughout the entire length of the truck so that the carriage may be elevated from the bottom to the top thereof when the truck is placed in inclined position, as shown in Fig. 1. To the top of each side beam is secured a strip 20 which overhangs the inner edge and forms a guard for the wheels 12. The overhanging portion of the last-mentioned strip is above the strip 19, and said parts form grooves in which the wheels of the carriage travel.

On the top cross bar 6 is mounted a pulley block 21 around which passes a hoisting line 22, one end of said line being wound on a shaft 23 extending across the beams 5 beneath the same, said shaft being journaled in bearings 24 carried by the beams, and having a crank handle 25 at one of its ends. A pawl-and-ratchet mechanism 26 for preventing back slip of the shaft is also provided. The other end of the line 22 passes around a pulley 27 mounted on one of the cross bars 11 of the carriage, from which pulley the line passes to the block 21 and is made fast thereto.

The herein described hoisting gear is provided for elevating and lowering the carriage on the truck. Near the top of the truck, the strips 19 carry projecting pins 28 which extend into the path of the tails of the latches 17. When the carriage reaches the upper end of the truck, the latches strike the pins 28 and are thus automatically disengaged from the rod 18, whereupon the tilting frame is unlocked, and it may be swung over to dump the load. The upper portion of the truck is also provided with legs 29 pivotally connected to the side beams 5 as indicated at 30. The free ends of the legs are also connected to the side beams by adjustable braces 31, said braces comprising slidably connected sections held in adjusted position by means of a pin 33 passing through the overlapping portions thereof, a series of apertures for the pin being provided in order to effect the adjustment.

The legs 29 may be employed for supporting the truck in elevated position by placing the same on the edge of the wall, scaffold or other part to which the load is to be carried, and the truck may be adjusted to any angle by adjusting the angle of the legs, which can be readily done by the adjustable connection 31. If desired, the legs can be removed and the truck may rest directly on the edge of the wall, scaffold, or other part.

The apparatus herein described is simple in construction, and can be easily handled. It is designed especially for handling bales of cotton and other heavy articles, and it can be used as an ordinary truck for hauling the load.

I claim:

1. An elevating apparatus comprising an inclined track, a carriage mounted for travel thereon, a hoisting device connected to the carriage, a tilting load carrier mounted on the carriage, said load carrier comprising spaced longitudinal bars pivotally connected to the upper end of the carriage and normally supported on top of the carriage, a portion of the side bars projecting beyond the upper end of the carriage, a latch for locking the load carrier, and a trip extending from the track into the path of the latch for releasing the same.

2. An elevating apparatus comprising an inclined track, a carriage mounted for travel thereon, said carriage comprising spaced longitudinal side bars extending parallel to the track and connected by cross bars, a hoisting device connected to the carriage, a latch carried by one of the longitudinal bars of the carriage, a tilting load carrier mounted on the carriage, said load carrier comprising spaced longitudinal bars supported on and pivotally connected to the side bars of the carriage at the upper ends thereof, a keeper on the load carrier for the aforesaid latch, and a trip extending from the track into the path of the latch for releasing the same.

3. An elevating apparatus comprising an inclined track, a carriage mounted for travel thereon, said carriage comprising spaced longitudinal side bars extending parallel to the track and connected by cross bars, a hoisting device connected to the carriage, a tilting load carrier mounted on the carriage, said load carrier comprising spaced longitudinal bars supported on and pivotally connected to the side bars of the carriage at the upper ends thereof, a latch for locking the load carrier to the carriage, and a trip extending from the track into the path of the latch for releasing the same.

In testimony whereof I affix my signature in presence of two witnesses.

DAVID M. WADLINGTON.

Witnesses:
J. E. ALLEN,
E. C. MASST.

---

Copies of this patent may be obtained for five cents each, by addressing the "Commissioner of Patents, Washington, D. C."